United States Patent [19]
Lacan

[11] Patent Number: 5,931,112
[45] Date of Patent: Aug. 3, 1999

[54] EASY-RELEASING CLEAT

[76] Inventor: Guy Henri Lacan, 19, rue des Champs Fleuris 78600, Le Mesnil le Roi, France

[21] Appl. No.: 08/925,757

[22] Filed: Sep. 9, 1997

[30] Foreign Application Priority Data

Sep. 10, 1996 [FR] France .................................. 96 11113

[51] Int. Cl.$^6$ .................................................. B63B 21/04
[52] U.S. Cl. ............................................................ 114/218
[58] Field of Search ..................................... 114/218, 199; 24/132 R, 132 AA

[56] References Cited

U.S. PATENT DOCUMENTS

| 1,783,433 | 12/1930 | Keller ..................................... 24/132 R |
| 3,580,209 | 5/1971 | Olson . |
| 5,070,805 | 12/1991 | Plante . |

FOREIGN PATENT DOCUMENTS 9004252   9/1991   Germany .

*Primary Examiner*—Ed L. Swinehart
*Attorney, Agent, or Firm*—William A. Drucker

[57] ABSTRACT

An easy-releasing cleat for sailboat deck equipment includes a sheave against which the rope can be pressed by a toothed roller rotatably mounted on an axle. The a toothed roller is provided with a controlable lock which can be set either in an unlocked position to let the a toothed roller freely rotate on its axle and the rope freely run between the roller and the sheave, or in locked position to prevent the roller from rotating on its axle and to hold firmly the rope against the sheave as a conventional cam would do. The releasing effort is reduced to the small necessary effort to unlock the controllable lock

9 Claims, 2 Drawing Sheets

EASY-RELEASING CLEAT

BACKGROUND OF THE INVENTION

1. Field of the Invention

The use of cam cleats for sail boats is well known in the prior art.

The rope is either pressed between two conveniently-shaped toothed cams or between a cam and a guide. With a correctly-chosen initial bite angle between cam and rope, any pull on the rope will draw the cam. The rope will be more and more pressed as the load increases.

The release is obtained by upward-pulling the rope parallely to the teeth.

When the rope guide is a sheave, the sheave groove prevents the rope from being pulled parallely to the teeth, and this is a strong limitation to the use of cam cleats with the sheaves, because the only release possibility consists in pulling back the rope by hand or by means of a winch in order to suppress any load on the cam before manually opening it.

Conventional cam cleats become harder to release as the wind increases and have earned the reputation for not releasing at the critical moment.

Tests have shown that an upward force of 40 to 60 kgs is needed to release a rope engaged in a cam cleat with a load of 130 kgs: well beyond the force that a man can easily develop at the end of his arm.

2. Description of the Prior Art

To our knowledge, nowhere in the device of the prior art is there to be found a direct solution to the easy release of a camming cleat for sailboat equipment in gusty conditions.

However, the U.S. Pat. No. 3,580,209 is a different approach of this problem, as the cam is replaced by a pivotally-mounted cam arm with a friction-controlled toothed wheel rotatably mounted at its end.

Above a predetermined force, the sheet will controllably play out.

This is not a general solution to the problem, for, in most applications, it is necessary to let the sheet, or the halyard, run totally free after releasing, notwithstanding the difficulty of setting the point at which the rope must begin to play out.

OBJECT AND SUMMARY OF THE INVENTION

It is therefore an object of this invention to provide an easy-releasing cleat by a system which comprises a toothed roller at the end of a pivoting arm associated to controllable locking means which can either firmly lock the toothed roller on its axle and securely hold the rope as a conventional camming cleat would do, or let the toothed roller freely rotate on its axle, and therefore the rope freely run between the roller and its guide.

The necessary releasing effort is the effort to be applied to the locking means to unlock the roller, which is a small fraction of the load applied to the rope.

In the same conditions as in the foregoing example of a 130 kgs load, this effort is as low as 6 kgs.

This is an important safety factor in gusty conditions, and this also improves the handling manoeuverability of a boat in all circumstances.

The various features of novelty which characterize the invention are pointed out with particularity in the claims annexed to and forming part of the disclosure.

BRIEF DESCRIPTION OF THE DRAWINGS

For a better understanding of the invention, its operating advantages and specific objects attained by its use, reference should be made to the accompanying drawings and described embodiments of the invention.

In the drawings.

DESCRIPTION OF A SPECIFIC EMBODIMENT

Figure 1:
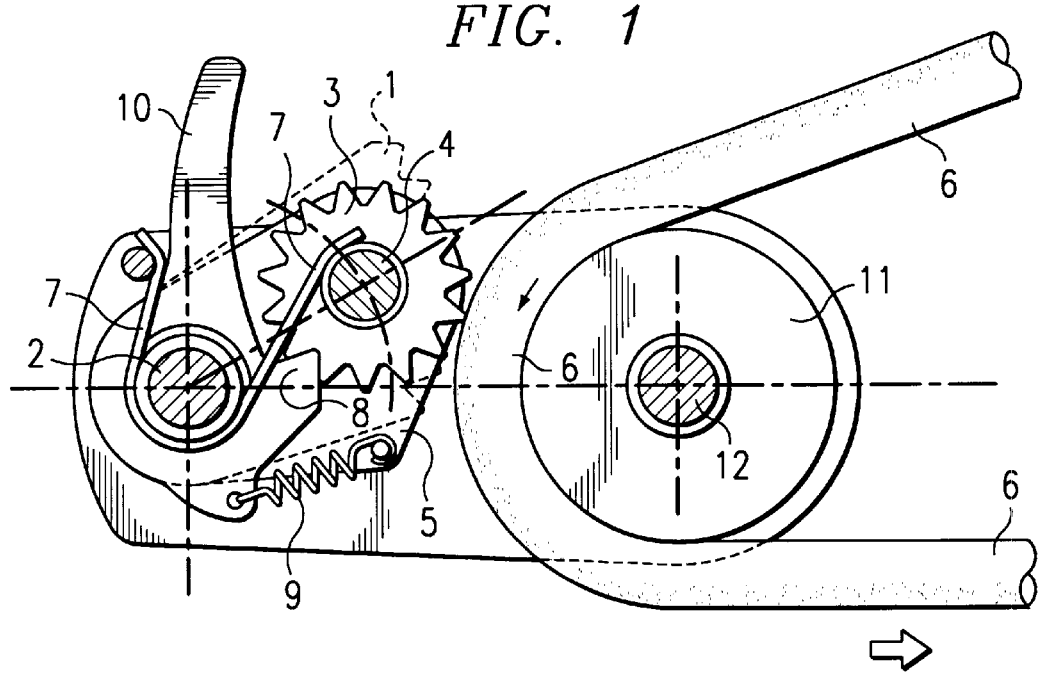
FIG. 1 is a schematic representation of an easy-releasing cleat according to the invention, with a first solution for the toothed roller locking means.

FIG. 1 is an illustration of an easy-releasing cleat according to the invention.

It is a cleat-against-sheave example.

A conventional cam 1 pivotally mounted on a fixed axle 2 has been represented in dotted lines to show the comparison with the invention. The cleat according to the invention comprises a toothed roller 3 the teeth of which correspond approximately in position to the teeth of the conventional cam.

The toothed roller 3 is rotatably mounted on an axle 4 supported between two cheeks 5 (only one cheek 5 has been represented for a better understanding of the internal structure).

Both cheeks 5 are pivotally mounted on the axle 2 (common with the conventional cam), and a spring 7 pulls the pivoting structure 5, 4, 3 against the rope 6. Said rope 6 is supported by the sheave 11 rotatably mounted on the axle 12.

A ratchet 8, pivotally mounted on the axle 2, is pushed towards the roller 3 by a spring 9, said ratchet 8 preventing the roller 3 from rotating when the cleat is opposed to the load.

When holding, the structure 5, 4, 3 behaves like the conventional cam 1, but all the difference appears at releasing.

In order to release, it is only necessary to open the ratchet 8 by its extension 10. Then, the roller 3 freely turns on its axle 4 allowing the rope 6 to freely run, without friction nor wear between the roller 3 and the sheave 11. The releasing effort is reduced to the necessary effort to open the ratchet under load.

Use of appropriate friction materials for the roller 3 and the ratchet 8 will reduce this effort to a minimum.

A small drawback of this design is that the pivoting structure 5, 4, 3, exactly as a conventional cam would do, will press more and more the rope against the sheave as the load applied to the rope increases. This means that the extension 10 will occupy an angular position depending on the load and also on the rope diameter.

Figure 2:
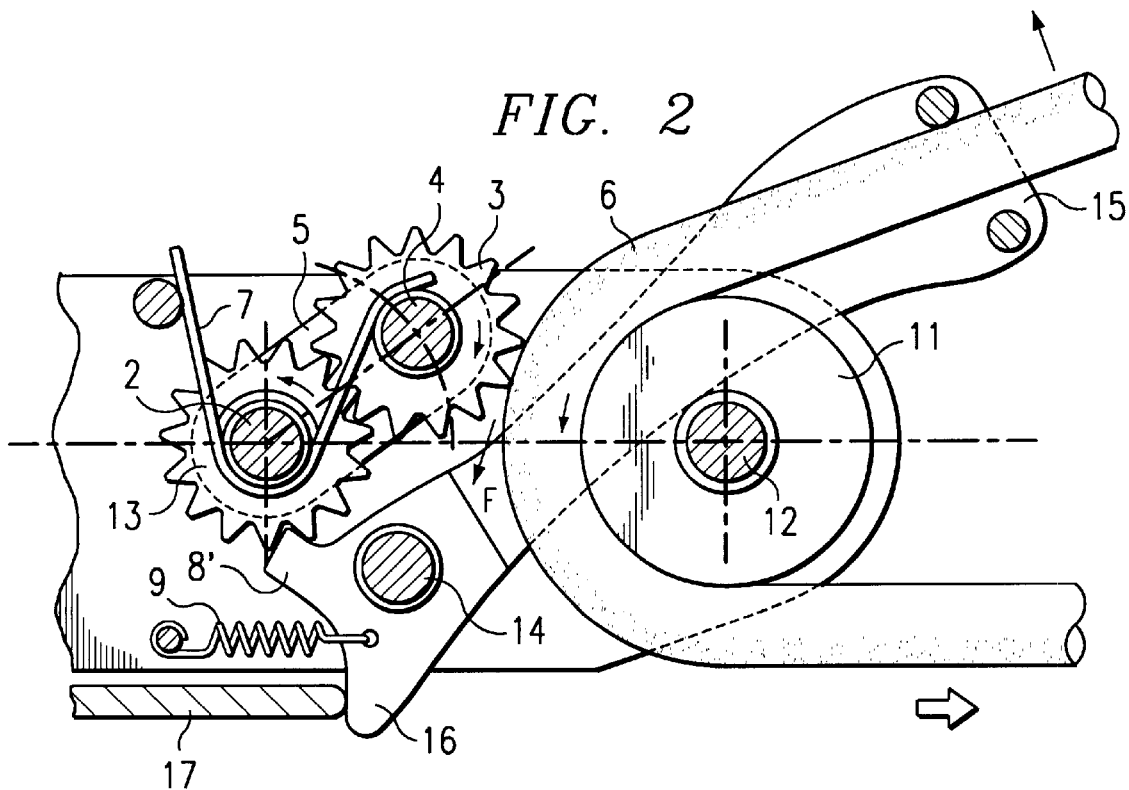
FIG. 2 is a schematic representation of an easy-releasing cleat according to the invention, with a second, more elaborate, solution for the toothed roller locking means.

Some applications require a more precise release angle or a fixed release angle. FIG. 2 shows a solution to this problem. The toothed roller 3 has a tooth profile capable of being geared with the teeth of a second free rotatably-mounted roller 13 centered on the axle 2. The ratchet 8 (called 8' in this application) is now pivotally mounted on a new fixed axle 14 and controls the toothed roller 13, thence the toothed roller 3.

With this disposition, the position of the release extension 15 of the ratchet 8' is totally independent of the load and of the rope diameter.

This combination of two toothed rollers geared according to a planetary configuration improves the performances of the cleat.

Compared with the conventional cam 1 of same size, the bite angle (which must be smaller than the friction angle between the rope and the cam teeth) is smaller, due to the fact that the toothed roller 3 no longer pivots on the axle 2, but on its instantaneous center which is located at the point of contact of the two geared rollers. It can be shown that from a bite angle point of view, this disposition is equivalent to a conventional cam about ⅓ bigger.

Moreover, the teeth in contact with the rope remain constantly normal to the rope surface, and this greatly improves the "biting".

FIG. 2 shows at 15 an extension of the ratchet 8' which is altogether fairlead and follower for the rope 6. When the leading end of the rope 6 is upward manoeuvered, it draws and opens the ratchet 8' and releases the cleat.

The planetary disposition of the toothed rollers also makes possible an automatic release.

An extension 16 of the ratchet 8' is, at rest, in front of an abutment 17.

The gap between these two parts is totally independent of the load and of the rope diameter. So, any relative movement conveniently oriented, initiated by an external means between these parts will open the ratchet and release the cleat.

Figure 3:
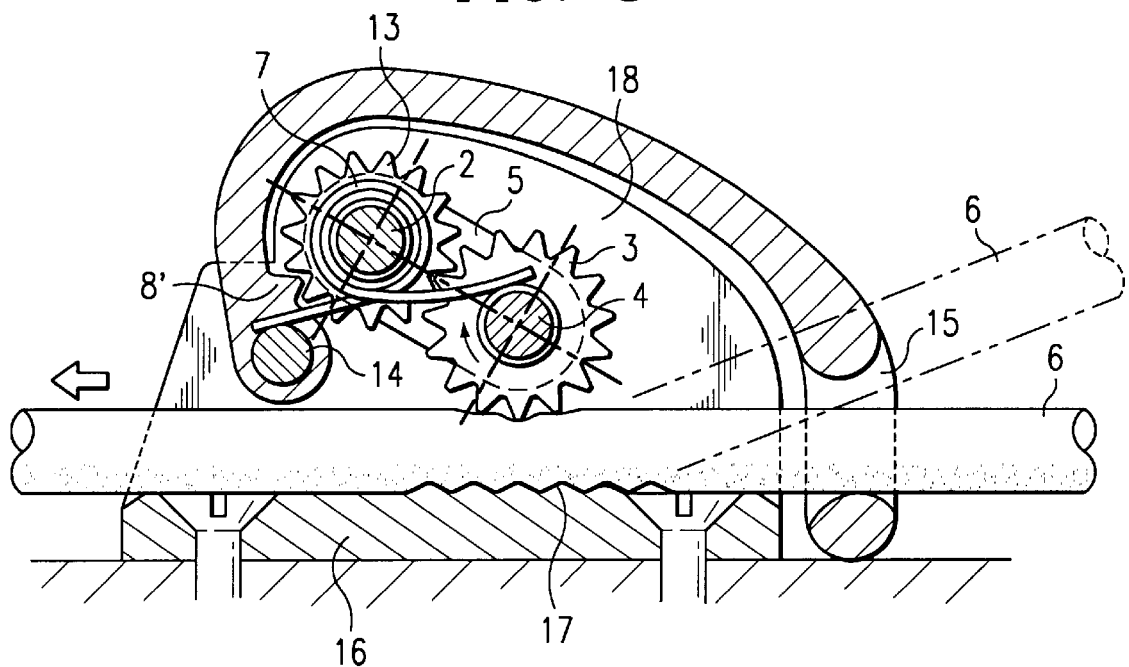
FIG. 3 shows the same system as described in FIG. 2, but applied to a linear rope guide in order to propose a substitute to the conventional cam cleat.

FIG. 3 illustrates a form of the invention which can be substituted to a conventional cam cleat.

The heart of the mechanism is the same as in FIG. 2 and does not necessitate a new explanation, but the rope 6 instead of being supported by a sheave, is pressed against the bottom 16 of a U-shaped base comprising some indentations 17 to improve the holding.

Two lateral cheeks 18 support the fixed axles 2 and 14. An extension of the ratchet 8' forms a fairlead 15 in which the rope 6 is passed.

An upward movement of the rope 6 will easily release the cleat.

Compared to a traditional cam-cleat with two horizontal cams, the invention:

is much easier to release, is about half the size (in width).

Figure 4:
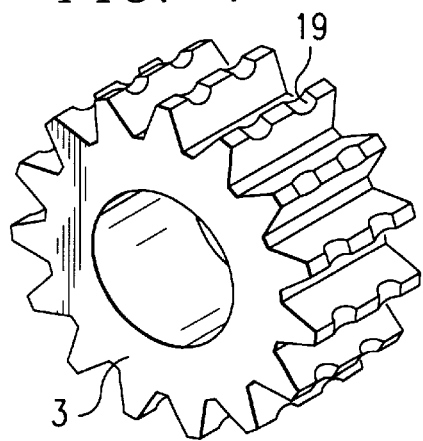
FIGS. 4 and 5 are illustrations of toothed rollers with various indentations to improve the friction between rope and roller.
Figure 5:
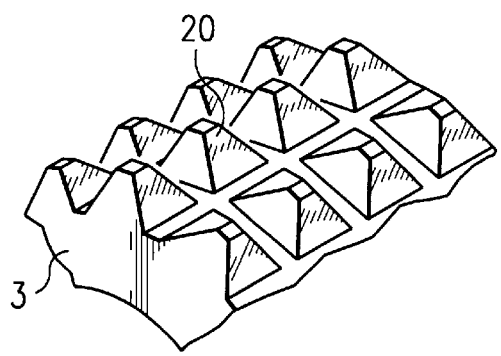

FIGS. 4 and 5 illustrate two possible improvements of the teeth shape to increase the friction between roller and rope.

As in a conventional cam-cleat, the teeth are straight and parallel, to allow the rope to be released by sliding it along the teeth. In the invention, and because releasing is obtained by the free rotation of the toothed roller, it is possible to increase the friction between the teeth tips and the rope by small indentations 19. Of course, these indentations must not alter the gearability of the two rollers.

Another form of teeth is shown in FIG. 5 in which every tooth has been replaced by a row of pyramidal embossments 20 the profile of which is always gearable with the toothed roller 13.

What is claimed is:

1. An easy releasing cleat for sailboat deck equipment comprising a rope guide against which the rope can be pressed by holding means adapted to prevent the rope from freely running in one direction, said holding means consisting in a toothed roller rotatably mounted on an axle being supported by a spring biased structure pivotably mounted on a fixes axle, said structure permanently pressing the a toothed roller against the rope, wherein, the a toothed roller is associated with controllable locking means which can be set either in an unlocked position which allows a free rotation of the a toothed roller on its axle and lets the rope running free between the roller and its guide, or in a locked position to prevent the a toothed roller from rotating in order to firmly hold the rope in one direction against its guide.

2. The easy-releasing-cleat as claimed in claim 1, wherein said toothed roller is rotatably controlled by a ratchet pivotally mounted on the fixed axle.

3. The easy-releasing cleat as claimed in claim 1, wherein said toothed roller is geared with a second toothed roller rotatably mounted on the fixed axle, said second roller being rotatably controlled by a ratchet pivotally mounted on a second fixed axle.

4. The easy-releasing cleat as claimed in claim 2, wherein the holding/releasing of the rope is manually controlled by an action on an extension of the ratchet.

5. The easy-releasing cleat as claimed in claim 3, wherein the holding/releasing of the rope is manually controlled by an action on an extension of the ratchet.

6. The easy releasing cleat as claimed in claim 2, wherein the holding/releasing of the rope is controlled by the angulation of said rope, said rope being connected to a mechanism which controls the ratchet.

7. The easy releasing cleat as claimed in claim 3, wherein the holding/releasing of the rope is controlled by the angulation of said rope, said rope being connected to a mechanism which controls the ratchet.

8. The easy-releasing cleat a claimed in claim 1, wherein the teeth of the roller in contact with the rope are gearable with another roller and present indentations at their tips.

9. The easy-releasing cleat as claimed in claim 1, wherein the teeth of the roller in contact with the rope are gearable with another roller and are constituted of rows of pyramidal embossments.

* * * * *